(12) United States Patent
Schlachman et al.

(10) Patent No.: US 6,504,925 B1
(45) Date of Patent: Jan. 7, 2003

(54) APPARATUS FOR ENABLING A TELEPHONE USER TO OBTAIN TELEPHONE DIRECTORY INFORMATION

(75) Inventors: David Schlachman, 501 Garrison Forest Rd., Owings Mill, MD (US) 21117; Larry G. Drummond, Glenelg, MD (US)

(73) Assignee: David Schlachman, Owings Mills, MD (US)

( * ) Notice: Subject to any disclaimer, the term of this patent is extended or adjusted under 35 U.S.C. 154(b) by 0 days.

(21) Appl. No.: 08/213,427

(22) Filed: Mar. 15, 1994

(51) Int. Cl.[7] .......................... H04M 3/00; H04M 1/00; H04M 1/56; H04M 15/06
(52) U.S. Cl. ............. 379/354; 379/355.02; 379/355.03; 379/142.08; 379/142.09
(58) Field of Search ................................ 379/354, 355, 379/356, 357, 98, 97, 96, 355.02, 355.03, 142.08, 142.09

(56) References Cited

U.S. PATENT DOCUMENTS

| | | | |
|---|---|---|---|
| 4,327,251 A | 4/1982 | Fomenko et al. | 379/76 |
| 4,482,786 A | 11/1984 | Flynn, Jr. | 379/355 |
| 4,633,041 A | * 12/1986 | Boivie et al. | 379/354 |
| 4,782,509 A | * 11/1988 | Shepard | 379/88 |
| 4,800,582 A | * 1/1989 | D'Agosto, III et al. | 379/355 |
| 4,839,919 A | * 6/1989 | Borges et al. | 379/98 |
| 4,862,497 A | 8/1989 | Seto et al. | 379/355 |
| 4,882,750 A | 11/1989 | Henderson et al. | 379/355 |
| 4,899,377 A | 2/1990 | Bauer et al. | 379/355 |
| 5,218,633 A | * 6/1993 | Clagett et al. | 379/96 |
| 5,583,919 A | * 12/1996 | Talvard et al. | |

FOREIGN PATENT DOCUMENTS

GB 2267414 * 12/1993 ............. 379/354

OTHER PUBLICATIONS

Telephone directories on CD ROM, Shumaker, L. Journal, p. 1, Jun. 1992.*
Telephone directories on CD ROM, Shumaker, L. Journal, pp. 1–6, Jun. 1992.*
On–Line Databases Turn A PC into a Complete Library, Messmer, Product Focus, Aug. 1987.*

* cited by examiner

Primary Examiner—Forester W. Isen
Assistant Examiner—Ramnandan Singh
(74) Attorney, Agent, or Firm—Lowe Hauptman Gilman & Berner, LLP

(57) ABSTRACT

Telephone directory information is obtained and telephone calls are placed with a telephone, a telephone directory memory storing signals representing names and telephone numbers of subscribers, a display, a QWERTY keyboard and special keys. The microprocessor responds to signals from a telephone keyboard, the QWERTY keyboard and special keys and is coupled with the memory and display so the memory is provided with signals causing names and telephone numbers of subscribers in the memory to be displayed. A modem connected to the microprocessor supplies a telephone dialing signal of the subscriber telephone number on the display to a telephone line in response to activation of keys of the keyboards and a signal from the memory. The memory includes a large permanent memory storing long term subscriber directory data and a smaller non-permanent memory storing recent subscriber data. The modem supplies the non-permanent memory with updated names and telephone numbers of recent subscribers derived from a central station. In response to activation of different combinations of keys on the keyboards and the special keys, the display is provided with (1) simultaneous display of names, phone numbers and addresses in response to a keyboard entered name, (2) an address and name in response to a keyboard entered phone number, and (3) simultaneous display of names and phone numbers in response to a keyboard entered address.

17 Claims, 10 Drawing Sheets

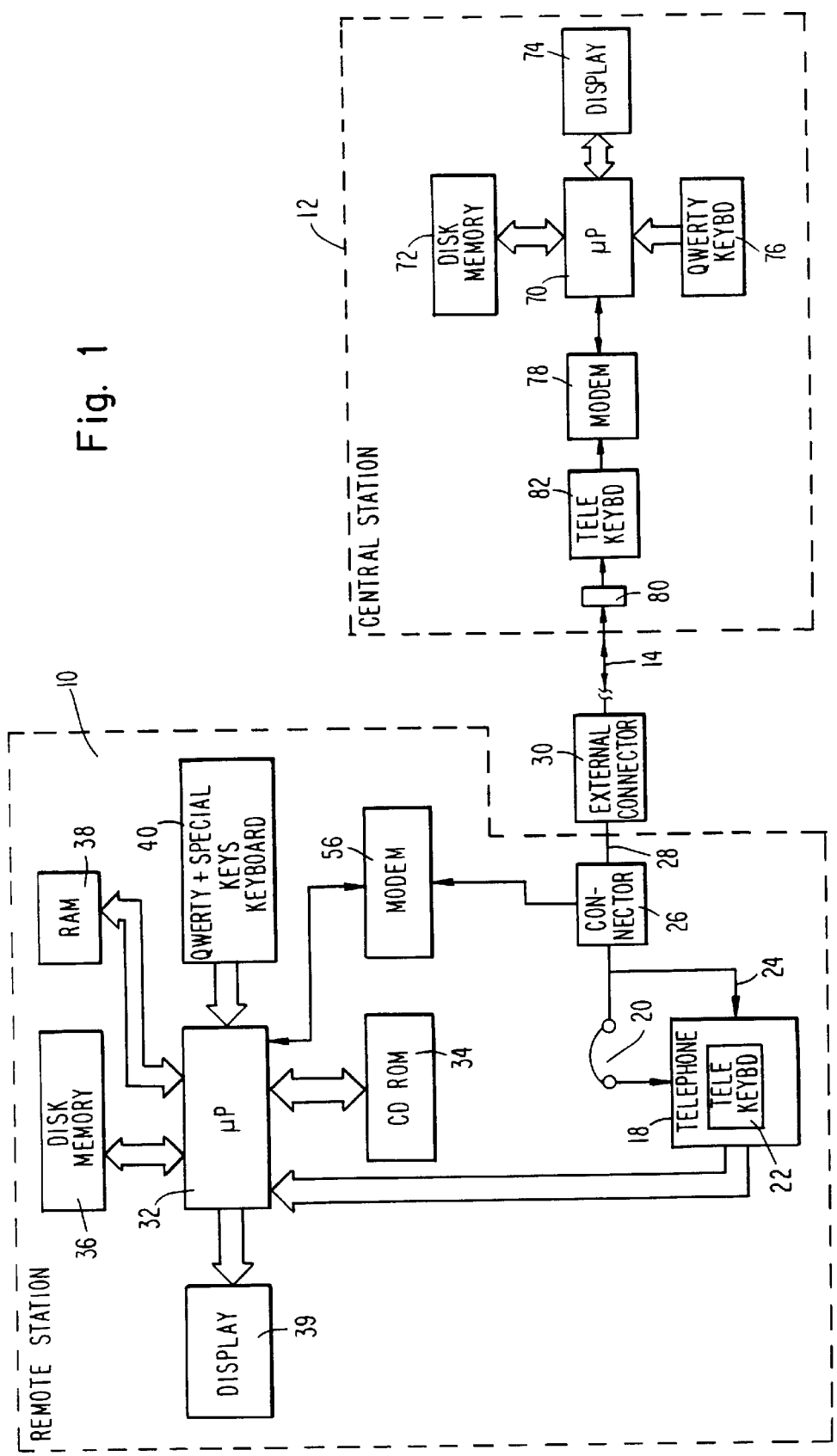

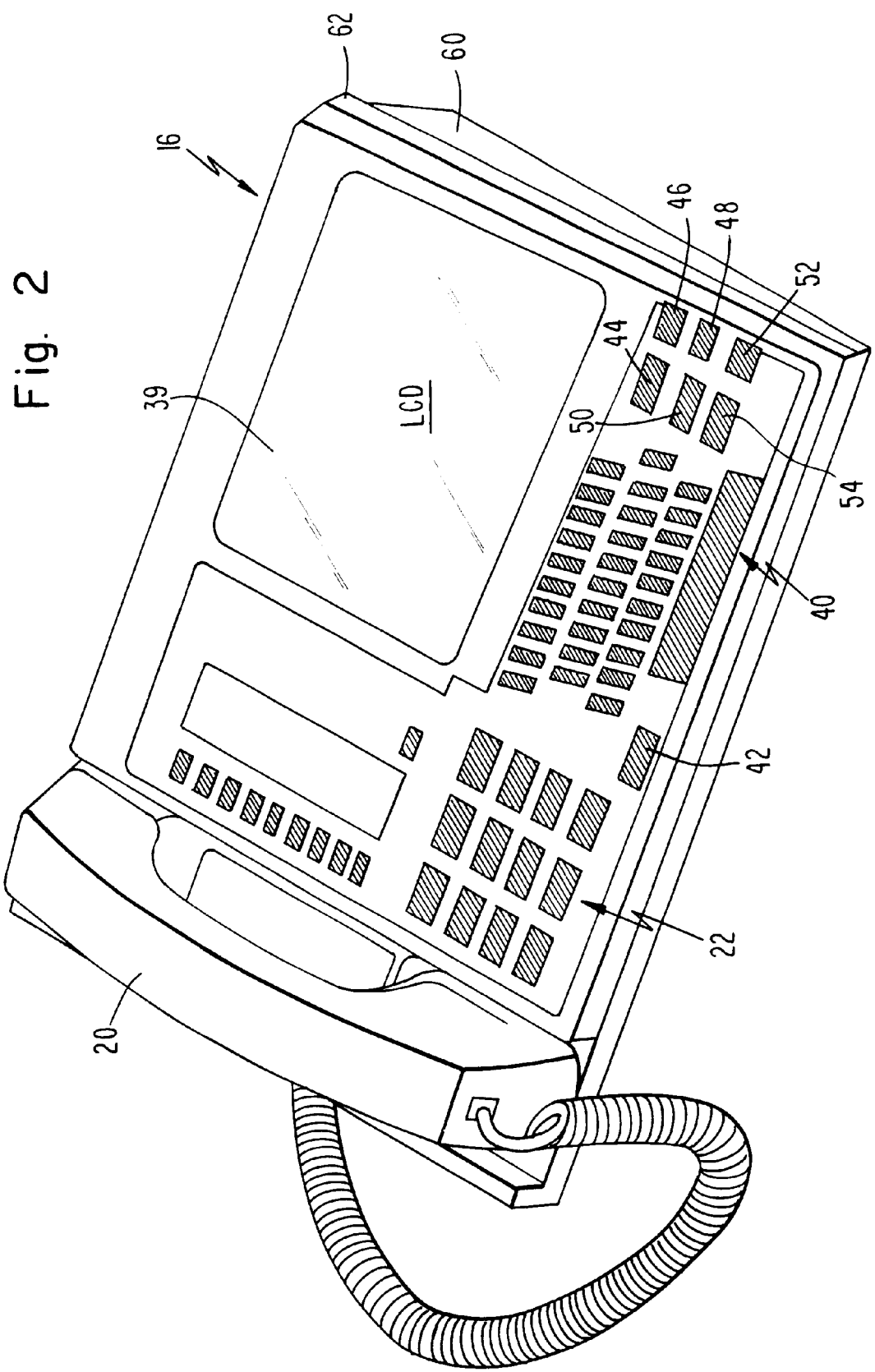

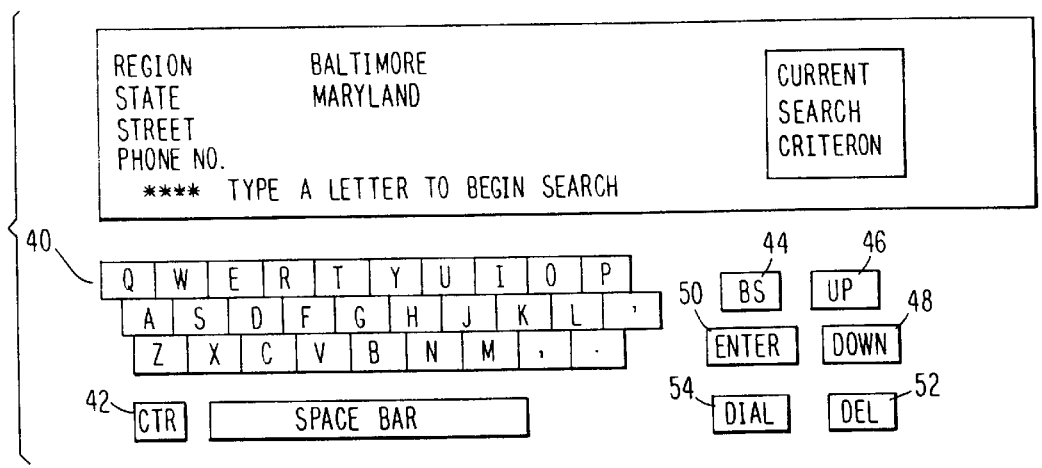

```
JoAFH, AMY         123 ANY STREET     BALTIMORE      410-123-4567
JAAx, ANDREA       67  THOMAS STREET  TOWSON         410-333-3333
FABLECKI, BARBARA  55  GUESS WHERE    ELDERSBERG     410-222-2222
BLONOWS, ANDY      67  SOME STREET    BALTIMORE      410-888-9999
ABLONSKI, SARAH    32  E. 33RD ST     REISTERSTOWN   410-666-8989
```

Fig. 5

```
JOaNNIDES, SARAH   123 ANY STREET     BALTIMORE      410-123-4567
JOBALAN, ANDY      67  THOMAS STREET  DUNDALK        410-333-3333
JOCIUS, BARBARA    55  GUESS WHERE    BALTIMORE      410-222-2222
JODON, SAMMY       67  SOME STREET    BEL AIRE       410-888-9999
JOEL, AMY          32  E. 33RD ST     BALTIMORE      410-454-4545
```

Fig. 6

```
JONaS, BARBARA     55  GUESS WHERE    EAST GATE      410-222-2222
JONAS, SAMMY       67  GREEN STREET   ARBUTUS        410-888-9999
JONES, AMY         32  E. 33RD ST     BALTIMORE      410-666-8989
JONES, ANDY        33  SOME STREET    BALTIMORE      410-888-3333
JONES, BARBARA     61  E. 44TH ST     BALTIMORE      410-454-4545
```

Fig. 7

```
CITY       BALTIMORE
STATE      MARYLAND                CURRENT
STREET                             SEARCH
PHONE NO.                          CRITERION
```

Fig. 8

```
CITY       BALTIMORE
STATE      MARYLAND             CURRENT
STREET                          SEARCH
PHONE NO.  410-888-9999         CRITERION
```

Fig. 9

```
JENNINGS, ANDY   67 SOME STREET   BALTIMORE   410-888-9999
```

Fig. 10

```
CITY       BALTIMORE
STATE      MARYLAND             CURRENT
STREET     11 MAIN STREET       SEARCH
PHONE NO.                       CRITERION
```

Fig. 11

| IRELAND, JOHN | 11 MAIN STREET | BALTIMORE | 410-123-8787 |
|---|---|---|---|
| KING, SANDRA | 11 MAIN STREET | BALTIMORE | 410-333-3656 |
| LAUNDRY, TOM | 11 MAIN STREET | BALTIMORE | 410-222-9799 |
| ZORO, AMOS | 11 MAIN STREET | BALTIMORE | 410-122-2121 |

Fig. 12

```
CITY       WASHINGTON
STATE      D.C.                 CURRENT
                                SEARCH
                                CRITERION
```

Fig. 13

```
CITY       WASHINGTON
STATE      D.C.                 CURRENT
STREET                          SEARCH
PHONE NO.                       CRITERION
    ****TYPE A LETTER TO BEGIN SEARCH
```

Fig. 14

```
        YOU HAVE SELECTED THE OPTION TO UPLOAD
        NEW DATA BASE INFORMATION.
          PRESS "Y" TO CONTINUE; ANY OTHER KEY TO EXIT
```

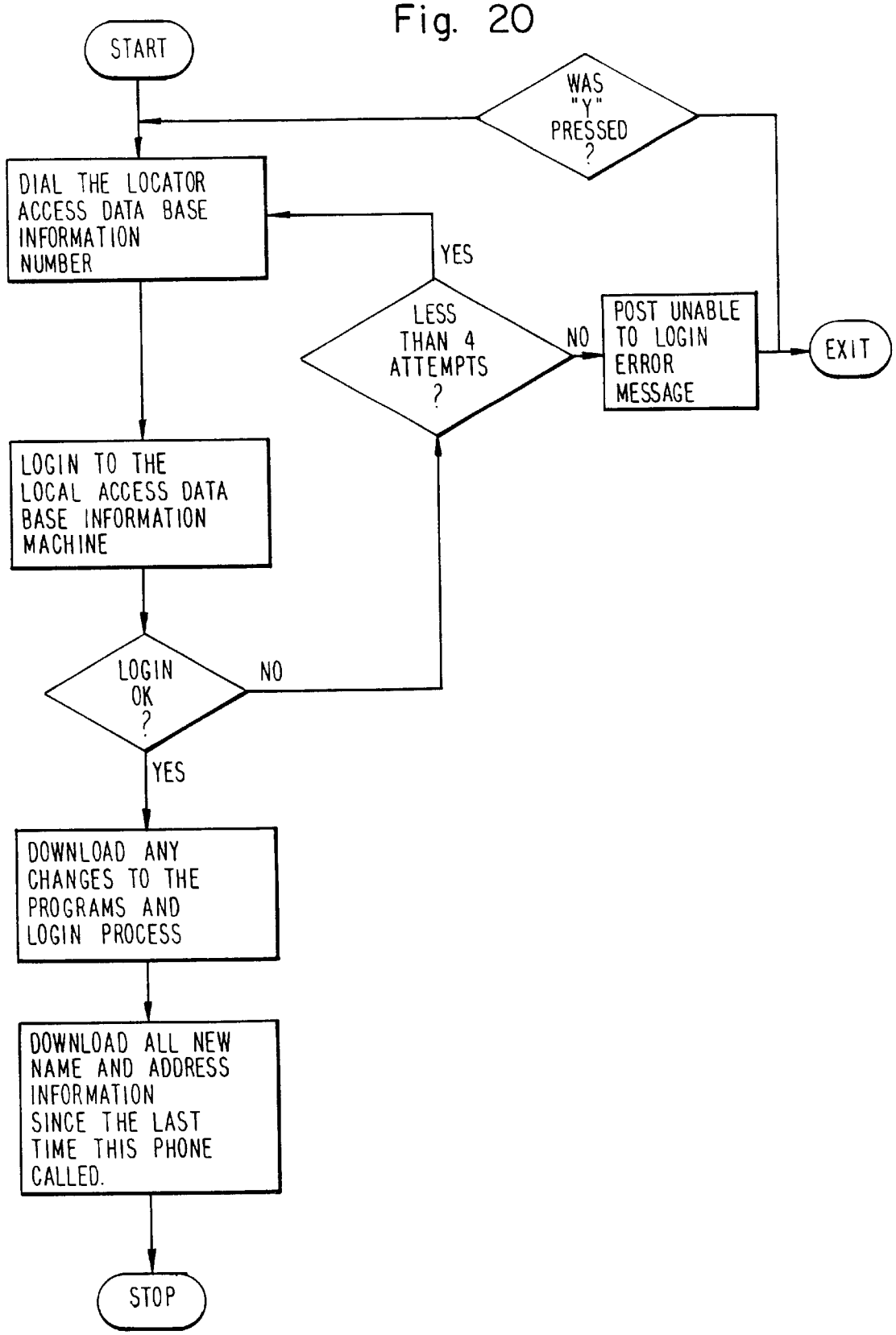

APPARATUS FOR ENABLING A TELEPHONE USER TO OBTAIN TELEPHONE DIRECTORY INFORMATION

FIELD OF THE INVENTION

The present invention relates generally to apparatus for enabling telephone users to obtain telephone directory information and more particularly to such an apparatus wherein a telephone is combined with a microprocessor, telephone directory storage device, QWERTY keyboard and a display.

BACKGROUND ART

Telephone users now usually obtain directory information from telephone directory books or by calling an information operator. Telephone directory books frequently require substantial time for a user thereof to locate the name, telephone number and address of a sought telephone subscriber. In addition, telephone directory books are relatively expensive to produce and distribute and are wasteful of natural resources, i.e., paper. Obtaining telephone directory information from an information operator is expensive to a person desirous of obtaining such information. Also, the process is somewhat time-consuming, requiring the person seeking the information to provide the name of the sought subscriber to an operator, who in turn must enter the name into a computer or locate it manually in a directory. Use of a telephone operator is also disadvantageous in certain instances in which the person seeking the information is not exactly sure of the particulars of the sought subscriber. It is also necessary for a person seeking subscriber information from an information operator to be equipped with a pencil and paper, unless the person seeking the information is willing to expend additional funds for the call to be placed by the telephone company.

One system which has been used to obtain subscriber directory information includes compact disc read-only memories (CDROMs). CDROMs must be used with CDROM readers, in turn connected to a personal computer including the usual keyboard and display. Hence, this prior art system is relatively expensive due to the need to employ a complete computer system, including all of the aforementioned devices. The computer must be somewhat sophisticated because of the requirement for a relatively large random access memory to be used with the CDROM reader. In addition, such systems can usually only be updated by obtaining new CDROMs, at relatively great expense.

It is, accordingly, an object of the present invention to provide a new and improved apparatus for enabling a person to easily obtain directory information about telephone subscribers.

An additional object of the invention is to provide a completely self-contained, relatively inexpensive apparatus for enabling a telephone user to be provided with subscriber telephone information.

Another object of the invention is to provide a new and improved apparatus that is relatively inexpensive and simple to use for enabling a telephone user to obtain telephone directory information for a large geographic area, without using an information operator or telephone directory books.

A further object of the invention is to provide, in combination with a telephone having a handset, a dedicated, relatively inexpensive, easy to use apparatus for enabling telephone users to be provided with telephone directory information.

An added object of the invention is to provide a new and improved apparatus for providing telephone users with telephone subscriber directory information in a format that is flexible and enables the user to be visually apprised of information about multiple subscribers simultaneously.

Yet another object of the invention is to provide a new and improved apparatus for providing telephone users with updated telephone subscriber directory information, wherein the apparatus is relatively inexpensive because it is dedicated only to this purpose and to conventional telephone functions.

THE INVENTION

In accordance with one aspect of the invention an apparatus for obtaining telephone directory information and placing telephone calls comprises a telephone having a telephone keyboard, a data memory storing telephone directory data signals representing names and telephone numbers of subscribers, a display, and a keyboard including a QWERTY section as well as special function keys. The microprocessor is connected to the memory, keyboards and display and is programmed so the display is provided with indicia representing names and telephone numbers of subscribers from the memory in response to activation of keys on the keyboards.

In accordance with another aspect of the invention an apparatus for use with a telephone comprises a microprocessor, a large permanent data memory storing telephone directory data including names and telephone numbers of long term subscribers, a smaller non-permanent data memory storing names and telephone numbers of recent subscribers, a display, and a keyboard including a QWERTY section as well as special function keys. The microprocessor is connected to (a) the memories, (b) keyboard and (c) display and programmed so the display is provided with names and telephone numbers of subscribers from both of the memories in response to activation of keys on the keyboard.

The apparatus is preferably included in a housing having a telephone handset receptacle and a telephone keyboard for controlling calls via a handset in the receptacle.

The apparatus also preferably includes a modem connected to the microprocessor for supplying a telephone dialing signal to a telephone line in response to a signal from the microprocessor. The signal supplied from the microprocessor to the modem is derived in response to activation of keys of the keyboard and a signal from one of the memories. The telephone dialing signal is for a telephone number of a subscriber on the display.

A modem is preferably connected to the microprocessor for supplying the smaller non-permanent memory via the microprocessor with updated names and telephone numbers of recent subscribers. To this end, a control station is connected to a telephone line. The modem responds to signals from the keyboard via the microprocessor for supplying the central station via the telephone line with a command for supplying the modem. The central station responds to the command for supplying the modem via the telephone line with the updated names and telephone numbers of recent subscribers.

In the preferred embodiment the command is accompanied by a signal identifying the modem. The central station responds to the modem identifying signal accompanying the command to supply updated names and numbers.

The modem is preferably connected to the microprocessor to supply a telephone dialing signal to a telephone line in response to a signal from the microprocessor. The signal from the microprocessor to the modem is derived in response to activation of keys of the keyboard and a signal from one of the memories. The telephone dialing signal is for a telephone number of a subscriber on the display.

In accordance with an additional aspect of the invention an apparatus for use with a telephone comprises a microprocessor, a memory means storing telephone directory data including names and telephone numbers of subscribers, a display, and a keyboard including a QWERTY section and special function keys. The microprocessor is connected to the memory means, keyboard and display. The microprocessor is programmed so the display is simultaneously provided with names and telephone numbers of plural subscribers from the memory means in response to activation of keys on the keyboard representing a sought subscriber.

Another aspect of the invention relates to an apparatus for use with a telephone as described previously wherein the microprocessor is programmed so the display is provided with a name and address of a sought subscriber from the memory means in response to activation of keys on the keyboard indicative of a telephone number.

An additional aspect of the invention concerns an apparatus for use with a telephone as previously described wherein the microprocessor is programmed so the display is provided with one or more names and telephone numbers of one or more subscribers from the memory means in response to activation of keys on the keyboard indicative of an address.

A further aspect of the invention relates to an apparatus for use with a telephone as previously described wherein the microprocessor is programmed so the display is provided with names and telephone numbers of subscribers in only one of plural different geographic regions in response to activation of keys on said keyboard until the keyboard is activated for another geographic region.

The above and still further objects, features and advantages of the present invention will become apparent upon consideration of the following detailed description of a specific embodiment thereof, especially when taken in conjunction with the accompanying drawings.

BRIEF DESCRIPTION OF THE DRAWING

FIG. 1 is a block diagram of electronic components included in a remote subscriber station and a central station in accordance with a preferred embodiment of the present invention;

FIG. 2 is a perspective view of a housing for the equipment at the subscriber station;

FIG. 3 is a diagram of a portion of the housing illustrated in FIG. 2, particularly the QWERTY keyboard, special keys and a multi-line display having exemplary indicia which are on the display when the apparatus is activated to a power on state;

FIGS. 4–6 are illustrations of the display with exemplary indicia while searching for addresses and telephone numbers of an exemplary subscriber entered via the QWERTY keyboard;

FIGS. 7–9 are illustrations of the display for exemplary indicia while searching for the name and address of a subscriber in response to a telephone number entered via a telephone keyboard;

FIGS. 10 and 11 are illustrations of the display with exemplary indicia while searching for the phone numbers of residents at a particular address;

FIGS. 12 and 13 are illustrations of the display when an exemplary location default search criterion is changed;

FIG. 14 is an illustration of the display during exemplary uploading of subscriber database information from a central station to a non-permanent memory in the remote subscriber station;

FIG. 20 is a flow diagram of operations performed at the remote subscriber station in response to QWERTY key Z and the CTR special key being activated.

DESCRIPTION OF THE PREFERRED EMBODIMENT

Figure 15:
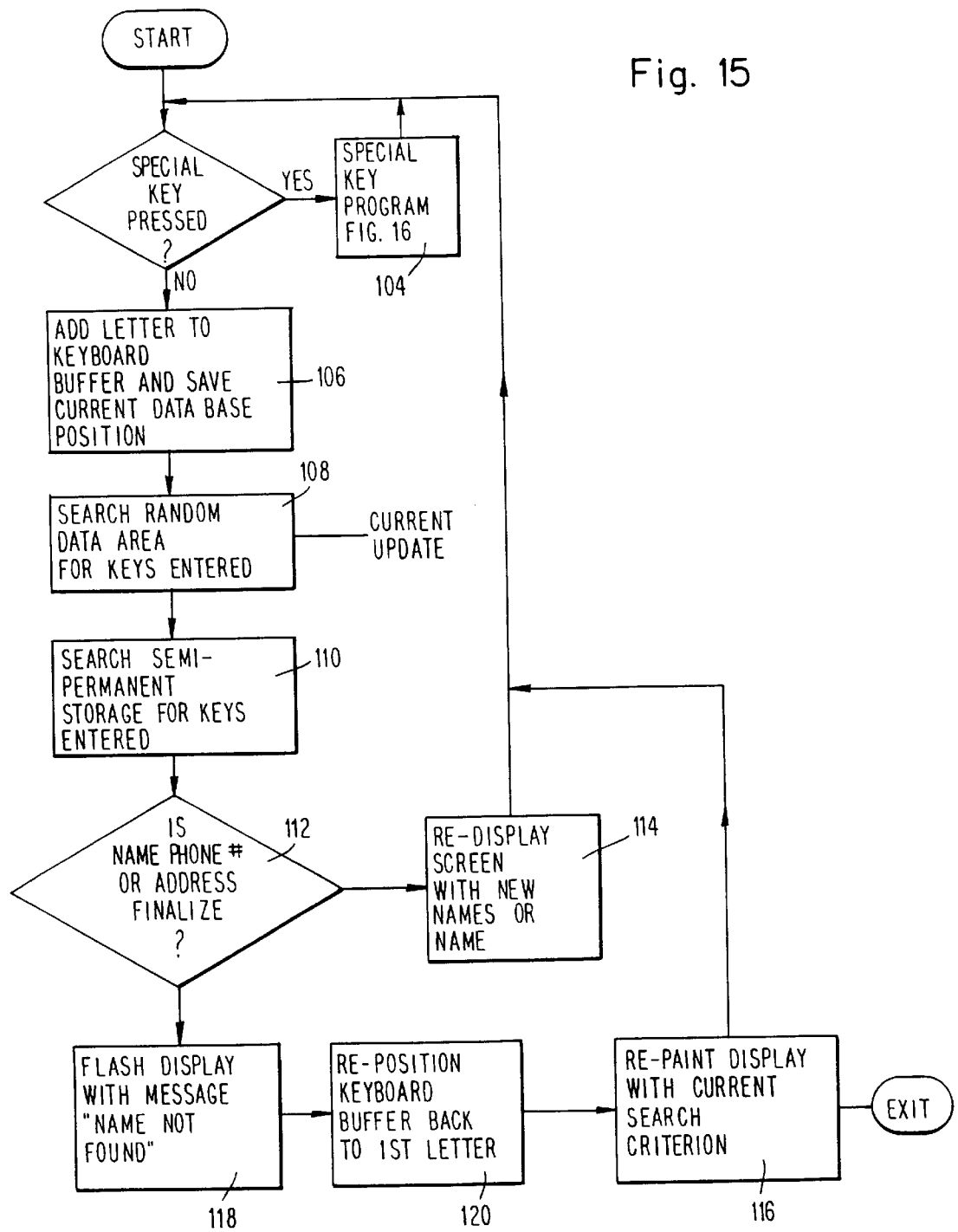
FIG. 15 is a flow diagram of operations performed at the remote subscriber station in response to activation of a key of the QWERTY keyboard and the special keys illustrated in FIGS. 2 and 3.

Reference is now made to FIG. 1 of the drawing, a block diagram of a remote subscriber station 10 in accordance with a preferred embodiment of the present invention and a central station 12 adapted to communicate telephone directory update information to the remote station via telephone line 14. The equipment at subscriber remote station 10 is included in a single housing 16, FIG. 2, and dedicated to a telephone subscriber and is not part of a general purpose personal computer. The equipment in housing 10 includes a conventional telephone 18 having handset 20, a 12-key telephone keyboard 22, keys for stored numbers and a recall key, as is conventional in current touch tone telephones. Telephone 18 is connected by line 24 through connector 26, in turn connected by line 28 to external connector 30, in turn connected to telephone line 14.

Housing 16 also includes a computer arrangement comprising microprocessor 32 having an internal read only memory (ROM) for controlling operations of the microprocessor and the program executed by the microprocessor. Alternatively, the control program for microprocessor 32 can be stored in an external ROM. Microprocessor 32 is also connected to large, permanent CDROM 34 which stores telephone directory data for a large geographic area, such as several states. The data stored in memory 34 include the names, addresses and telephone numbers of subscribers over the large geographic area. Microprocessor 32 is also connected to a smaller erasable, non-permanent, magnetic disc memory 36 which stores updated directory information, i.e., the names, addresses and telephone numbers of subscribers who have come on line in the telephone system since production of CDROM 34. Memory 36 can also store the control program for microprocessor 32 and can be of other erasable types, such as a semiconductor memory. Microprocessor 32 is also coupled with an appropriate random access memory 38 which handles data and other signals transferred between the microprocessor and the devices connected to it.

Memories 34 and 36 are arranged by geographic region, with all subscribers in a particular region (city) having a first index associated therewith; thus, e.g., data concerning all subscribers in the Baltimore, Maryland region stored in memories 34 and 36 have the same first index. The subscribers in each particular region in memories 34 and 36 have a second index; each second index in a particular geographic region is alphabetically arranged by subscriber name. There are spaces between adjacent second indices of permanent memory 34 to provide room for indices for updated subscribers added to memory 36. Assume, for example, that indices 2 and 5 under the letter J for the Baltimore, Maryland region in permanent memory 34 are provided for the names JAATH, AMY and JACBLECKI, BARBARA. This leaves room for insertion of a name, with index 1, into temporary memory 36 before JAATH, AMY and for the name JAA, ANDREA at index 3 in the temporary memory.

Microprocessor 32 is also connected to telephone keyboard 22 and keyboard 40, including a QWERTY portion and several special keys. As illustrated in FIGS. 2 and 3, the QWERTY portion of keyboard 40 includes the upper case 26 letters of the English alphabet, a period key, a comma key and a conventional space bar. Keyboard 40 has seven special keys, namely control (CTR) key 42, back space (BS) key 44 for moving a cursor backwards one space along the line where it is located, up (UP) key 46 for moving the cursor up one line, down (DOWN) key 48 for moving the cursor down one line, enter (ENTER) key 50 for causing certain operations to be performed by microprocessor 32, dial (DIAL) key 54 for commanding the microprocessor to supply dialing signals to line 28 via connector 26 and modem 56 and delete (DEL) key 52 for deleting an entered character above the cursor.

Microprocessor 32 is also connected to five-line alphanumeric liquid crystal display (LCD) 39 with a cursor. Display 39 is located on an upper face of housing 16 to the right of telephone keyboard 22, and above QWERTY keyboard 40.

As illustrated in FIG. 2, a housing for CDROM 34 is selectively inserted into housing 16 through slot 60 in sidewall 62 of the housing. This enables CDROM 34 to be removed from time to time, as necessary, when disc memory 36 approaches a completely filled state, as occurs in response to updated directory information being loaded therein.

Central station 12 includes microprocessor 70, connected to disc memory 72, random access memory 73, display 74 and QWERTY keyboard 76. Microprocessor 70 is also connected to modem 78, in turn connected to telephone line 14 via connector 80 which is also connected to telephone keyboard 82 at the central station. Memory 72 stores updated directory data, particularly names, addresses and telephone numbers of recent subscribers, i.e., subscribers who have come on line since the CDROMs 34 at remote stations 10 were produced. In addition, memory 72 stores information about the remote subscriber stations, such as when a particular remote subscriber station last requested an update, and the telephone number as well as location of each remote subscriber station. Updated data are read into memory 72 via microprocessor 70 in response to signals from QWERTY keyboard 76. Information supplied to microprocessor 70 from QWERTY keyboard 76 is displayed on LCD display 74, which also displays information about communications occurring between central station 12 and the remote subscriber stations.

Microprocessor 32 is programmed so that when power is initially applied to it and display 39 and while the microprocessor and display are in a quiescent condition, indicia are on five lines of the display, as illustrated in FIG. 3, assuming remote subscriber station 10 is located in the Baltimore, Md. area. As indicated in FIG. 3, the left sides of the first and second lines of display 39 respectively include the fixed legends REGION and STATE, followed by changeable legends indicating the geographic region (assumed to be BALTIMORE) and the state where the geographic region is located (assumed to be MARYLAND). The left side of the third and fourth lines of display 39 respectively bear the legends STREET and PHONE NO. of a sought subscriber; no characters follow the legends on the left sides of lines of the third and fourth lines. The fifth and last line of the display bears the legend TYPE A LETTER TO BEGIN SEARCH. To the right of the message, and on the second, third and fourth lines of the display appear the legends CURRENT, SEARCH and CRITERION respectively. The message "CURRENT SEARCH CRITERION" signals to the operator that the primary geographic region of interest is being searched, rather than a secondary or default region.

In response to a user typing a letter on QWERTY keyboard 40 to begin a search for the street and phone number of a sought subscriber whose name is known, display 39 is altered so each of the five lines of the display contains the name, phone number and address of a subscriber stored in memory 34 and/or 36. As each letter for a sought subscriber is activated on QWERTY keyboard 40, display 39 is subject to change. Characters inputted via keyboards 22 and/or 40 are compared in microprocessor 32 with characters in memories 34 and 36. Data signals from memories 34 and 36 indicative of the name, address and phone number for the first five directory subscribers having the same initial characters as the keyboard characters are initially coupled from memories 34 and 36 into RAM 38, thence to the display buffer of microprocessor 32 and from there to display 39. When a sufficient number of the characters for the sought subscriber name (e.g. four) have been entered by the user via keyboard 40 and/or 22, name, address and phone number data signals for all directory entries identical to the inputted characters are read from memories 34 and 36 and written into RAM 38. Signals for the first five subscribers are initially read from RAM 38 to the display buffer of microprocessor 32 and from there to display 39. If the user wants to scroll through the subscribers, using UP and DOWN keys 46 and 48, a pointer in microprocessor 32 for RAM 38 is correspondingly incremented, causing scrolling of the addresses of RAM 38. As the addresses of RAM 38 are scrolled, subscriber information data signals for five different subscribers are continuously read from the RAM into the display buffer of microprocessor 32, thence to display 39.

Assume that it is desired to locate the address and telephone number of an individual named Sam Jones in the Baltimore, Md. region and that the apparatus at station 10 has been activated so the region in memories 34 and 36 it normally accesses is Baltimore, Md. In response to the user activating the "J" key of QWERTY keyboard 40 with the display in the state illustrated in FIG. 3, names from memories 34 and 36 are read into microprocessor 32 and supplied by the microprocessor to display 39. In the stated situation, in response to the letter J being typed on the QWERTY keyboard, the fiveline display presents the legends illustrated in FIG. 4. Hence, the names of the first five subscribers having the letter J as the first letter of their last name in the Baltimore, Md. region are retrieved from memories 34 and 36, alphabetically arranged in microprocessor 32 by index number and respectively supplied to RAM 38, then to the display buffer of the microprocessor, thence to the five lines of display 39. Accompanying each subscriber name is the address of the subscriber, including his street and town, followed by the telephone number of the subscriber. The first letter in the display, i.e., the J associated with Amy Jaath, is highlighted and the second letter of Amy Jaath's name has a cursor under it. Because the cursor is under the second letter of Amy Jaath's name, the user is provided with an indication that the next letter to be typed on QWERTY keyboard 40 will replace the first "a" in Amy Jaath's name.

The user then types the second letter of the last name, i.e., the "O" in Sam Jones' name, causing the display to be activated to the condition illustrated in FIG. 5. In response to the letters J and O being in the first and second positions on the display, signals are read from memories 34 and 36 into microprocessor 32, thence to RAM 38 and the display buffer memory of microprocessor 32, causing display 39 to present the first five alphabetized names in the memory corresponding with the letters J and 0. The first two letters in the first line are highlighted and the cursor is moved under the third letter in the first line. Hence, the screen provides an alphabetical listing of those subscribers in the Baltimore region whose names start with the letters "JO."

The user then activates the "N" key of QWERTY keyboard 40, causing data to be read from memories 34 and 36 into microprocessor 32, whereby display 39 presents the legend illustrated in FIG. 6. The first three letters of the first line of display 39 are now highlighted and the cursor appears under the fourth character in the first line of the display. The user continues to enter the full name of the sought subscriber. When the entire name has been typed and appears on the top line of the display, the telephone number and address of the sought subscriber are completely highlighted. If, however, there are several subscribers with the name being sought, up to five of them appear simultaneously, because the contents of memories 34 and 36 are read to RAM 38 and the user can make a choice as to which subscriber is most likely to be the sought subscriber. The user presses UP and DOWN keys 46 and 48 to scroll the information for subscribers which have been read from memories 34 and 36 into RAM 38 or to move the display one line at a time and thereby control the name on the first line of the display if there are several subscribers with the sought name. As UP and DOWN keys 46 and 48 are scrolling the display, the cursor keeps track of the current name for which changes can be made.

When the cursor is on the subscriber being sought, the user presses DIAL key 54, which causes the telephone number associated with the line of the display where the cursor is located to be dialed by microprocessor 32. Dialing signals corresponding with the sought telephone number are then coupled via modem 56 to telephone line 28. The number is thereby called, enabling the user at remote station 10 to speak with the called subscriber via handset 20 and telephone 18. In response to the user at station 10 activating DIAL key 54, microprocessor 32 is activated to cause display 39 to return to the status indicated in FIG. 3. Alternatively, display 39 and the buffer in microprocessor 32 driving the display can retain the telephone directory information, including the name, address and telephone number of the sought subscriber, until a connection has been established with the telephone of the sought subscriber. This feature is useful if the telephone of the sought subscriber is busy or the connection is not established for some other reason. Alternatively, the number of the sought subscriber can remain stored in RAM 38 if the connection is not established.

The apparatus of the present invention can also be operated to enable the name and address of a sought subscriber to be obtained from a known telephone number of the subscriber. To change the normal operation from that described in connection with FIGS. 4 and 6 to obtain names and addresses from phone numbers, the screen display is initially in the condition illustrated in FIG. 3. Then the user sequentially activates CTR key 42 and key S of QWERTY keyboard 40. The user then activates DOWN key 48, to move the cursor from the first line of the display to the fourth line of the display, as illustrated in FIG. 7. The user then activates the numeric keys of telephone keyboard 22 to enter the telephone number of the sought subscriber, causing the display to have the appearance illustrated in FIG. 8. Preferably, the telephone number of the sought subscriber is highlighted.

The user then activates ENTER key 50. The entered telephone number for the sought subscriber is transferred into a buffer memory of microprocessor 32 and telephone numbers are then read into the microprocessor from the portions of CDROM 34 and disc memory 36 associated with the Baltimore, Md. region. The telephone number stored in the buffer in response to activation of keyboard 22 is compared in the microprocessor with telephone numbers read from CDROM 34 and disc memory 36 until the number from the telephone keyboard is the same as the number read from one of the memories. The name and address of the found sought subscriber are then read from the appropriate memory into a display buffer memory of microprocessor 32, thence to display 39 and presented on one line of the display as illustrated in FIG. 9. Preferably, the name, address and telephone number of the sought subscriber are all highlighted. If it is desired to call the telephone of the highlighted sought subscriber whose name, address and telephone number appear on the top line of the display, as illustrated in FIG. 9, the user activates DIAL key 54.

The apparatus of the present invention can also be used to determine the names and telephone numbers of all telephone subscribers at a particular address. This operation is initiated with display 39 having the same legends as illustrated in FIG. 3. The user then sequentially activates CTR key 42 and the S key of QWERTY keyboard 40 to change the search criterion of the apparatus. The cursor is then moved from the first line of the display to the third line of the display by the user pressing DOWN key 48 or ENTER key 50 twice in succession. The address of the sought subscriber is then entered using telephone keyboard 22 and QWERTY keyboard 40, causing the display to have the legend illustrated in FIG. 10, whereby the third line of the display has the address of the sought subscriber and the fourth line of the display is blank. The cursor is then moved down from the third to the fourth line of display 39, by pressing DOWN key 48. The user then activates ENTER key 50, causing the address which has been loaded into a buffer of microprocessor 32 to be compared with addresses in CDROM 34 and disc memory 36. Addresses in the portions of memories 34 and 36 associated with the region and state on the first and second lines of display 39 are compared and data for those addresses corresponding with the address displayed on the third line of the display (as illustrated in FIG. 10) are stored in RAM 38. After all of the appropriate addresses have been compared, data in the appropriate addresses of RAM 38 are written into the buffer memory of microprocessor 32 for display 39, thence to the display, to fill an appropriate number of lines on the display, as illustrated in FIG. 11, where four of the five lines of the display contain the name and telephone number of subscribers at the entered address.

If more than five subscribers are at the entered address, the information for the subscribers is read from RAM 38 to the display in response to the user activating DOWN key 48. Initially, the indicia on the first line of display 39 are highlighted. As the cursor is scrolled through the display in response to activation of DOWN key 48, different subscribers are highlighted. The display remains stationary as scrolling proceeds if the number of subscribers to be displayed is fewer than the number of lines on the display. The telephone of the highlighted subscriber is dialed in response to the user of station 10 activating DIAL key 54.

As previously indicated, the apparatus is capable of obtaining information and dialing telephones in several different regions. The apparatus normally operates for one of these regions but it is possible to change the region where the apparatus normally operates by entering a default search criterion. To enter the default search criterion from the display screen legends illustrated in FIG. 3, the user sequentially activates CTR key 42 and key D of QWERTY keyboard 40. This causes the indicia in the box on the right side of display 39 to change from CURRENT SEARCH CRITERION to DEFAULT SEARCH CRITERION, as illustrated in FIG. 13. The cursor remains stationary and is under the letter "B" on the first line of the display.

The geographic region where subscribers will normally be sought can now be changed. Assume, for example, that it is desired for the normal region and state to be changed from Baltimore, Md. to Washington, D.C. Under these circumstances, the user activates QWERTY keyboard 40 to enter the word "WASHINGTON" in line 1 of the display. After typing the last "N" in "WASHINGTON," the user presses DOWN key 48, causing the cursor to return to line 2 of the display under the letter "M." The user then types the characters "D. C." and activates the space bar of the QWERTY keyboard until all letters of the word "MARYLAND" on the second line of the display have been removed. The user then activates ENTER key 50, to complete entry of the new default search criterion, causing the screen to have the configuration illustrated in FIG. 13. In FIG. 13, the cursor is under the letter W in the first line of the display and the box on the right side is changed from "DEFAULT SEARCH CRITERION" to "CURRENT SEARCH CRITERION."

The operations described in connection with FIGS. 12 and 13 involve a semipermanent change in the region from which subscribers are sought. It is also possible to temporarily change the region and state where a particular subscriber is being sought. For example, if the apparatus is normally searching for subscriber information in the Washington, D.C. region, it can be activated to search for one or a few subscribers in the Pittsburgh, Pa. region. With display 34 as illustrated in FIG. 13, the user activates QWERTY keyboard 40 to enter PITTSBURGH, PENNSYLVANIA in the same manner that the display was changed from BALTIMORE, MARYLAND to WASHINGTON, D.C. However, after typing PITTSBURGH, PENNSYLVANIA, the user positions the cursor back to the P in the first line and determines the telephone number of a sought subscriber in the Pittsburgh, Pa. region in the same manner that a sought subscriber was obtained for Baltimore, Md. Similarly, the name and address of a subscriber whose telephone number in the Pittsburgh area is known can be determined as described above, as can the name and telephone number of all subscribers at a particular address in the Pittsburgh, Pa. region. After information for the Pittsburgh area has been obtained and the operator wishes to return to the Washington, D.C. region, CTR key 42 and the R key of the QWERTY keyboard are sequentially pressed, causing the display to return to the condition illustrated in FIG. 13.

A feature of the invention is that updated data can be transferred from central station 12 to disc memory 36 at remote subscriber station 10. Such updating is accomplished using the telephone line and enables the directory information at remote station 10 to be kept as current as desired by the user at station 10. Updating is performed by the user sequentially pressing CTR key 42 and QWERTY key Z. In response to the update mode being entered in response to activation of CTR key 42 and QWERTY key Z, the second, third and fifth lines of the display are provided with the indicia illustrated in FIG. 14. In response to the user then activating key Y of the QWERTY keyboard, disc memory 36 is loaded with updated subscriber information.

To this end, remote subscriber station 10 automatically dials the database at central station 10 to access disc memory 72 at the central station. Disc memory 72 includes a signal indicating the last time the particular remote subscriber station accessed the central station for updating. Subscriber information signals are then read from disc memory 72 of central station 12 into random access memory 73 at the central station to load the random access memory with signals representing the names, telephone numbers and addresses of the updated subscribers who need to be transmitted via telephone line 14 to remote station 10. These data signals stored in random access memory 73 are coupled through microprocessor 70 to modem 78 and supplied via modem 56 and microprocessor 32 to disc memory 36. Between transmission of adjacent subscriber data signals, central station 12 transmits a data signal indicative of the percentage of the updated data that have been transmitted. The percent completed data are supplied as indicia, in a conventional manner, through microprocessor 32 to the bottom line of display 39.

When all of the updated data signals have been read out of RAM 73, microprocessor 70 generates a "message complete" signal which is transmitted to remote subscriber station 10. Remote subscriber station 10 responds to the "message complete" signal to cause display 39 to provide the legend DATABASE COMPLETE. In addition, a date and time stamp is displayed on display 39. If, for some reason, all of the updated data signals are not transmitted or a connection was not established between remote subscriber station 10 and central station 12, display 39 is activated accordingly. In particular, if the connection is not established in response to the operator pressing the Y key of the QWERTY keyboard, the read only memory associated with microprocessor 32 causes the microprocessor to provide display 39 with the legend UNABLE TO ESTABLISH CONNECTION TO CENTRAL DATABASE. If the connection between remote station 10 and central station 12 is broken prior to the central station transmitting a message complete signal to the remote station, microprocessor 32 supplies display 39 with the legend CONNECTION TO CENTRAL DATABASE LOST. If either of the foregoing two messages is displayed, the user reenters the update mode by sequentially activating CTR key 42 and QWERTY key Z. The sequence previously described is then reinitiated.

Figure 16:
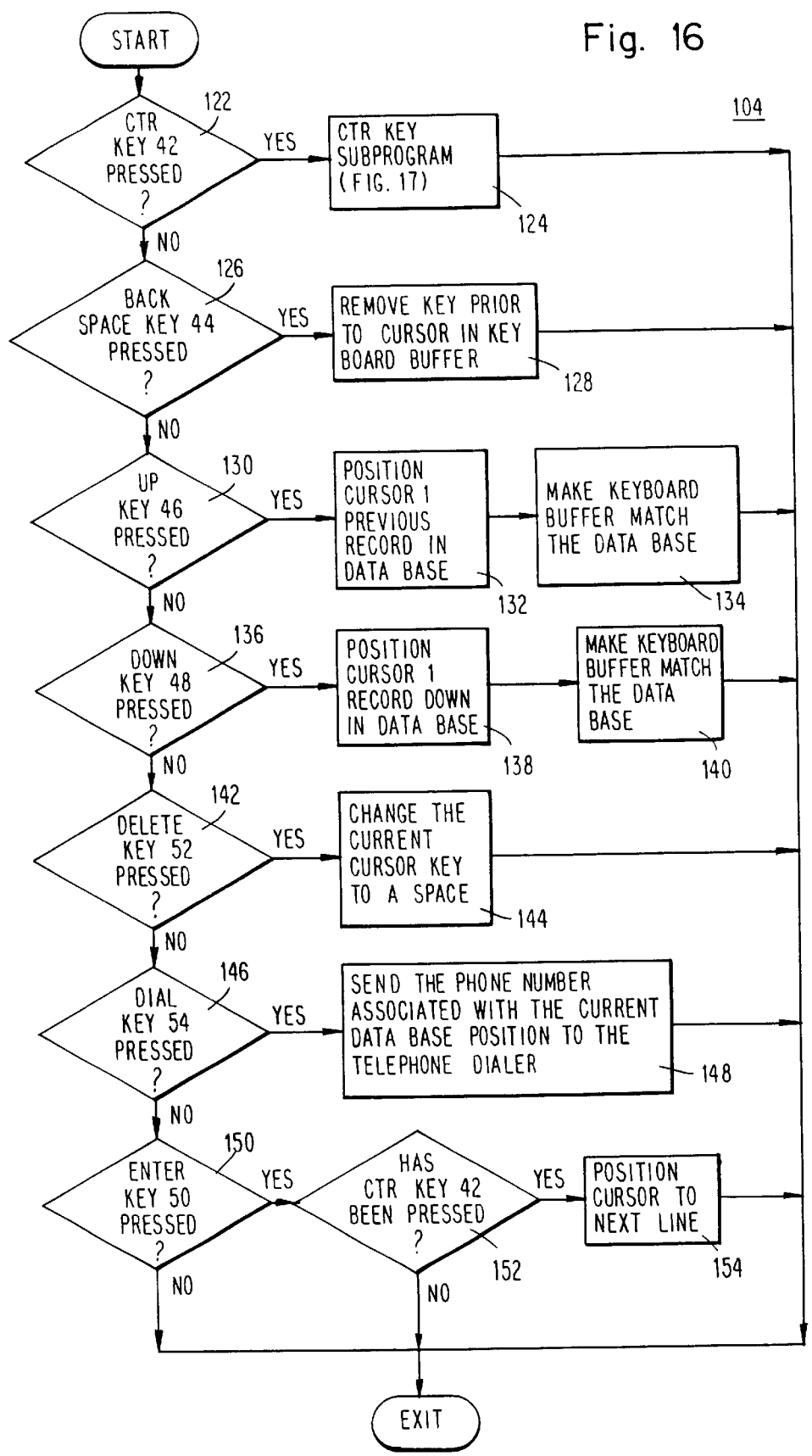
FIG. 16 is a flow diagram of operations performed at the remote subscriber station in response to special keys of the keyboard illustrated in FIGS. 2 and 3 being activated.

Microprocessor 32 is programmed as indicated by the flow charts of FIGS. 15–20 to perform the aforementioned operations. In response to a key on either the QWERTY keyboard 40 or the telephone keyboard 22 being activated, the main logic program of FIG. 15 is entered. The first operation 102 performed by the main logic program is to determine if a special key 42–54 has been activated. If one of special keys 42–54 has been activated, special key program 104, FIG. 16, is executed, as described infra. If, however, one of the keys of the QWERTY keyboard 40 or of telephone keyboard 22 has been pressed, the remainder of the program of FIG. 15 is executed and involves finding the phone number and address of the named sought subscriber.

The program continues from operation 102 to operation 106, where the signal associated with the pressed letter key of QWERTY keyboard 40 or numeric key from telephone keyboard 22 is supplied to a keyboard buffer of microprocessor 32 and a signal indicative of the position of the key on the display is supplied to a display position buffer in the microprocessor by incrementing a counter in the microprocessor for character position, as a function of line and space number in the display. After operation 106, the updated directory portion of disc memory 36 is searched and compared with signals representing the alpha and numeric values stored in RAM 38 for the data signals which have been entered via the QWERTY keyboard 40 and telephone keyboard 22; operation 108. After the updated directory portion of disc memory 36 has been searched, a search for the same data in CDROM 34 is performed during operation 110.

After memories 34 and 36 have been searched, step 112 determines if the search resulted in a positive comparison, i.e., if the signals corresponding with the characters entered via keyboard 22 and/or 40 are associated with signals that can be found in memory which represent a name. In other words, if the signal representing a letter or number or combination thereof stored in RAM 38 was located in either of memories 34 or 36, a YES result is derived from operation 112. The number of characters compared during operations 108 and 110 is equal only to the number of characters entered in keyboards 22 and/or 40 to speed the search process and enable the user to obtain a better grasp of the directory contents. This is particularly useful if the user is not sure of the spelling of the sought subscriber. If a YES result is derived during operation 112, the signals from the memory location or locations of memories 34 and 36 corresponding to the signals for the entered letters of the sought subscriber are read out from the memory(s) and stored in the display buffer of microprocessor 32 and coupled from that buffer to display 39, to provide one of the sets of legends described supra in connection with FIGS. 3–6; operation 114. After operation 114 has been executed, the program returns to operation 102.

Hence, in a name comparison, as described in connection with FIGS. 3–6, after the first letter of the sought name has been entered via keyboard 40, only signals representing the first letter of names in memories 34 and 36 are examined. The names associated with the second letter of the sought name having the highest alphabetic position, i.e., having the letter A following the first entered letter, are read from memories 34 and 36 into RAM 38, as described in connection with FIG. 5. After the third letter of the name has been entered, the first three letters of the names in memories 34 and 36 corresponding with the first three letters of the sought name are read into RAM 38, as described in connection with FIG. 6. However, for the second and third scenarios, a name is not findable if the combination of letters entered during normal operation, under scenario 1, does not exist in either of memories 34 or 36. If, for example, the first and second letters entered for a sought directory name are JB and there is no name in either of memories 34 or 36 beginning with the letters JB, the result from operation 112 is "no."

If operation 112 yields a "no" result, the program advances to operation 118, which causes a region of disc memory 36 or the read only memory (ROM) associated with microprocessor 32 containing the indicia NAME NOT FOUND to be read out and stored in the buffer memory of microprocessor 32 for display 39, whereby the first line of display 39 is supplied with the message NAME NOT FOUND and the rest of the display is blanked. After operation 118 has been performed, the keyboard buffer for the position of the cursor on display 39 is repositioned back to the first line and first letter of the display during operation 120. At this time, the display buffer of microprocessor 32 is erased so the display is as indicated in FIG. 3. After operation 120 has been executed, the legend CURRENT SEARCH CRITERION is written or re-printed in the box on the right side of display 39 during operation 116. After operation 116 the program returns to initial operation 102.

Consideration is now given to FIG. 16, the special key program 104 performed when a "yes" result is provided by "special key pressed" operation 102. When special key program 104 is initially entered, a determination is made during operation 122 as to whether control (CTR) key 42 is activated. If control key 42 is activated, program 104 advances to control key subprogram 124, FIG. 17. If control key 42 was not pressed, special key program 104 advances to operation 126, when a determination is made as to whether backspace key 44 is pressed. If operation 126 indicates backspace key 44 is activated, the cursor of display 39 is backspaced, i.e., moved to the left, one position on the same line of display 39 during operation 128 as a result of a buffer memory of microprocessor 32 where cursor position is stored being decremented by one.

If operation 126 indicates backspace key 44 is not activated, program 104 advances to operation 130, when a determination is made as to whether UP key 46 is activated. In response to UP key 44 being activated, the program advances to operation 132, which causes the cursor position buffer memory in microprocessor 32 to be activated so the cursor is moved up one line, to the same space across the line. In response to the cursor memory being so activated, there is a corresponding movement of the position of the cursor of display 39. After operation 132 has been performed, the keyboard buffer memory in microprocessor 32 is activated so it stores alpha numeric indicia for the new line where the cursor is located; operation 134.

If operation 130 indicates "up" key 46 is not activated, program 104 advances to operation 136, when a determination is made as to whether or not "down" key 48 is activated. In response to operation 136 indicating "down" key 48 is activated, the program advances to operation 138, during which the buffer memory of microprocessor 32 where cursor position is stored is activated to indicate the cursor is on the next lower line of the display and at the same space as where the cursor was previously located. After operation 138 has been executed, the keyboard buffer in microprocessor 32 is activated to store the alpha numeric characters on the new line of display 39 where the cursor is located.

If operation 136 indicates "down" key 48 is not pressed, program 104 advances to operation 142, when a determination is made as to whether DELETE key 52 is activated. If operation 142 finds DELETE key 52 is activated, the buffer memory of microprocessor 32 for display 39 is activated so it stores a "space," i.e., a value causing neither an alpha nor a numeric value to be indicated on the display position where the cursor is located.

If operation 142 finds DELETE key 52 is not pressed, program 104 advances to operation 146, during which a determination is made as to whether DIAL key 54 is activated. In response to DIAL key 54 being activated, operation 148 is executed. During operation 148, microprocessor 32 supplies modem 56 with a signal corresponding to the telephone number of the sought and found subscriber.

Modem 56 responds to this signal, to supply appropriate dialing signals to telephone line 28 to call the sought subscriber.

If operation 146 determines that DIAL key 54 is not activated, program 104 advances to operation 150, during which a determination is made as to whether ENTER key is activated. If operation 150 determines that ENTER key 50 is activated, program 104 advances to operation 152, during which a determination is made as to whether control key 42 is activated. If the result of operation 152 is a "yes," the program advances to operation 154, during which the cursor of display 39 is moved downwardly to the first space of the next line.

Program 104 is exited after any of the following, as appropriate, have been performed: control key subprogram 124 and operations 128, 134, 140, 144, 148, 150 or 154. Program 104 is also exited if either of operations 150 or 152 yields a "no" result.

Figure 17:
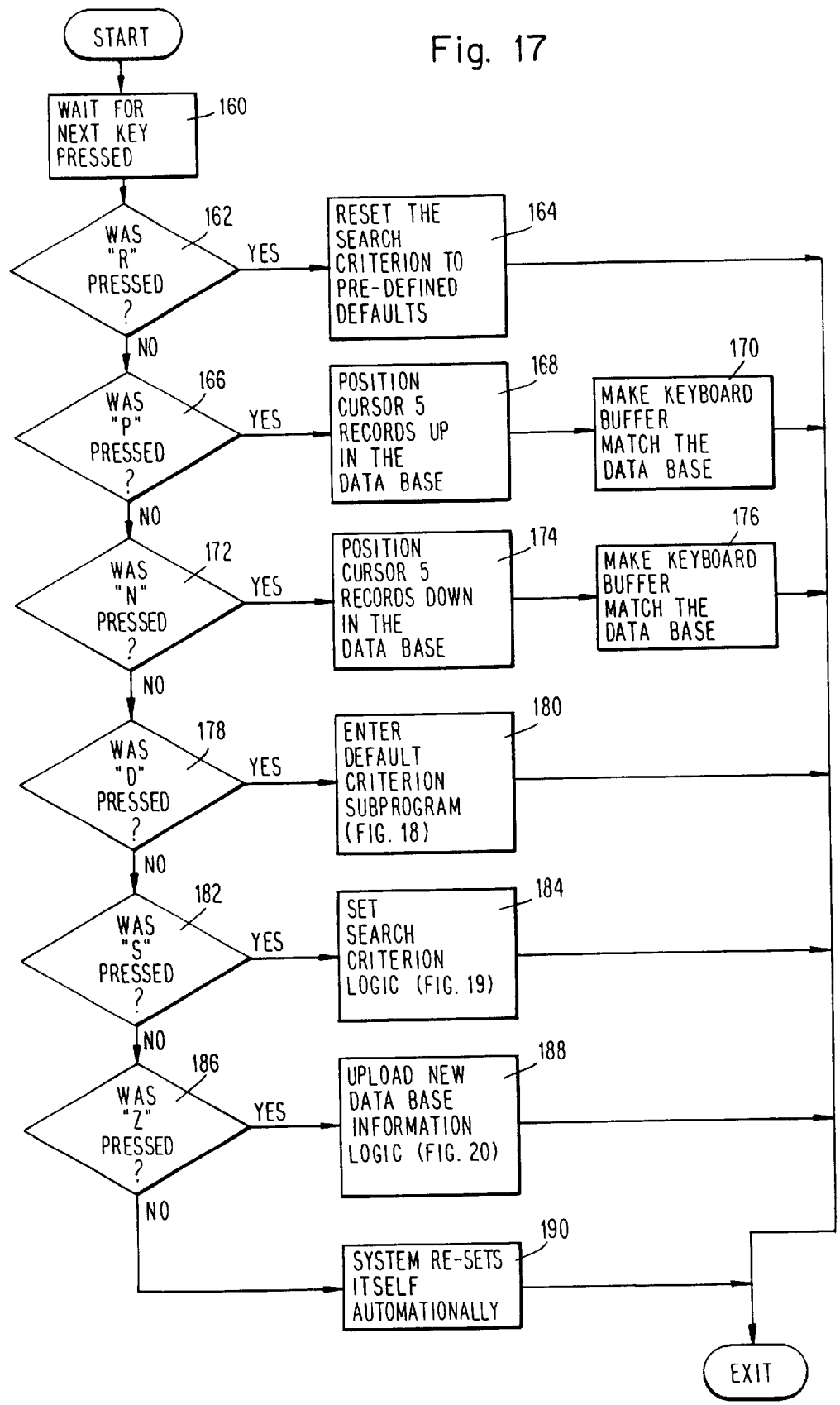
FIG. 17 is a flow diagram of operations performed at the remote subscriber station in response to a control (CTR) special key of the keyboard illustrated in FIGS. 2 and 3 being activated.

Reference is now made to FIG. 17, a flow diagram of operations performed in subprogram 124, FIG. 16, which is entered in response to CTR key 42 being activated, as sensed during operation 122. If, immediately after CTR key 42 is activated, one of six different keys on QWERTY keyboard 40 is activated one of six different control operations is performed. The first operation 160 of control subprogram 124 is to wait for a signal from telephone keyboard 22 or QWERTY keyboard 40 indicative of one of the keys of either keyboard being activated. After operation 160, subprogram 124 advances to operation 162, to determine whether the R key of QWERTY keyboard 40 is activated immediately after activation of CTR key 42. In response to the R key of QWERTY keyboard 40 being activated, subprogram 124 advances to operation 164 during which the search criterion is reset to predefined defaults. If operation 162 determines that the R key of the QWERTY keyboard is not activated, program 124 advances to operation 166, when a determination is made as to whether the P key of QWERTY keyboard 40 is activated immediately after CTR key 42. In response to operation 166 determining that the P key of QWERTY keyboard 40 is activated, the position of the cursor on display 39 is moved up five records in the database stored in RAM 38; operation 168. This is accompanied by addressing RAM 38 to a position five addresses up in the database supplied to the RAM by memories 34 and 36. After operation 168 has been performed, the keyboard buffer of 32 responds to the address now being accessed in RAM 38; operation 170.

If operation 166 indicates the P key of QWERTY keyboard 40 is not pressed, program 124 advances to operation 172, during which a determination is made as to whether the N key of the QWERTY keyboard is activated.

In response to the N key of QWERTY keyboard 40 being activated, subprogram 124 positions the cursor of display 39 down five records in the database stored in random access memory 38 and an address five addresses down from the previous read address of the random access memory is accessed. The program then advances to operation 176, during which the keyboard buffer of microprocessor 32 is supplied with the data at the accessed address of RAM 38.

Figure 18:
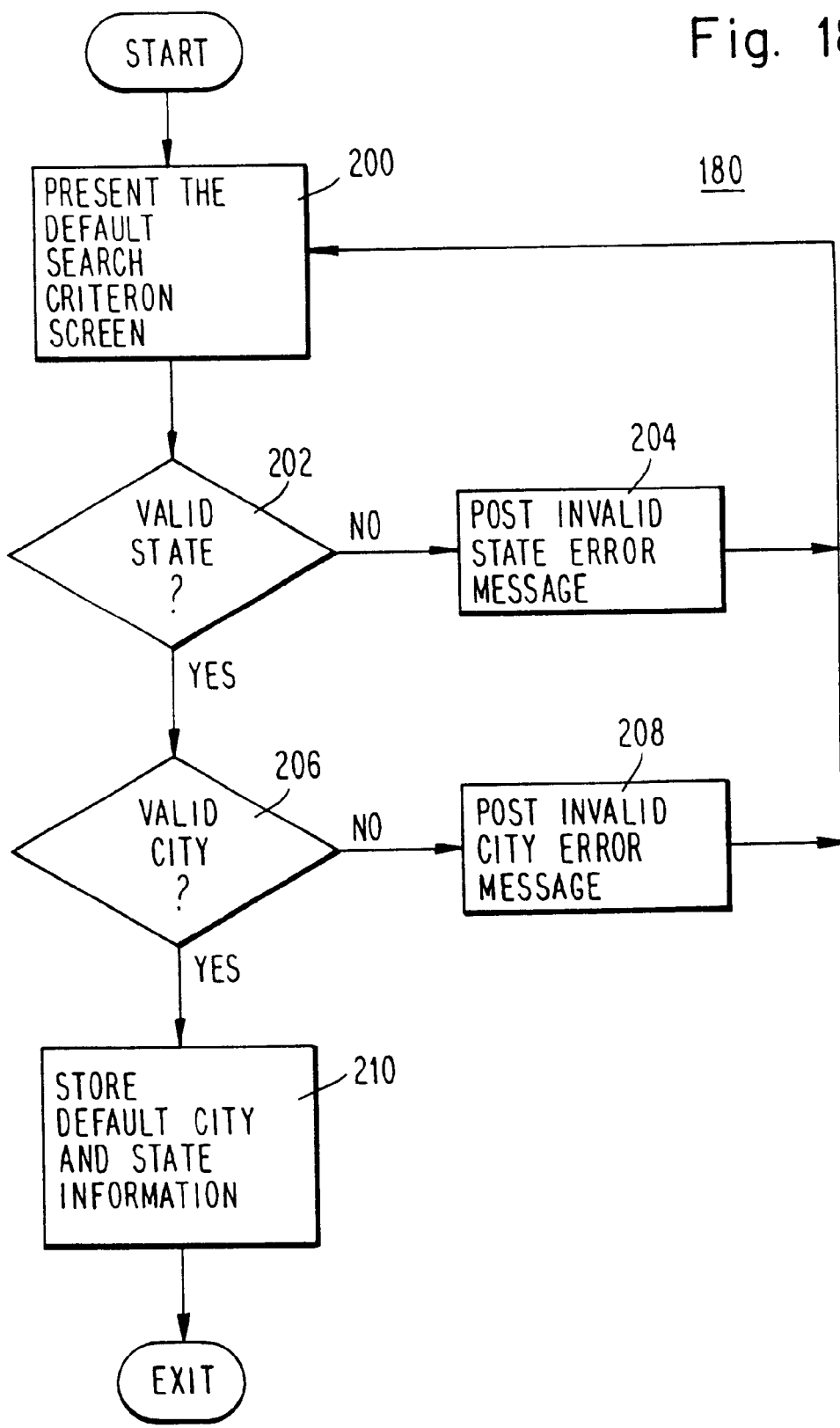
FIG. 18 is a flow diagram of operations performed at the remote subscriber station in response to QWERTY key D and the CTR special key being activated.

In response to operation 172 determining that the N key of QWERTY keyboard 40 is not activated, subprogram 124 advances to operation 178, during which a determination is made as to whether the D key of QWERTY keyboard 40 is activated. In response to the D key of the QWERTY keyboard being activated, subprogram 124 advances to operation 180, when the default criterion subprogram, illustrated in detail in FIG. 18, is entered.

Figure 19:
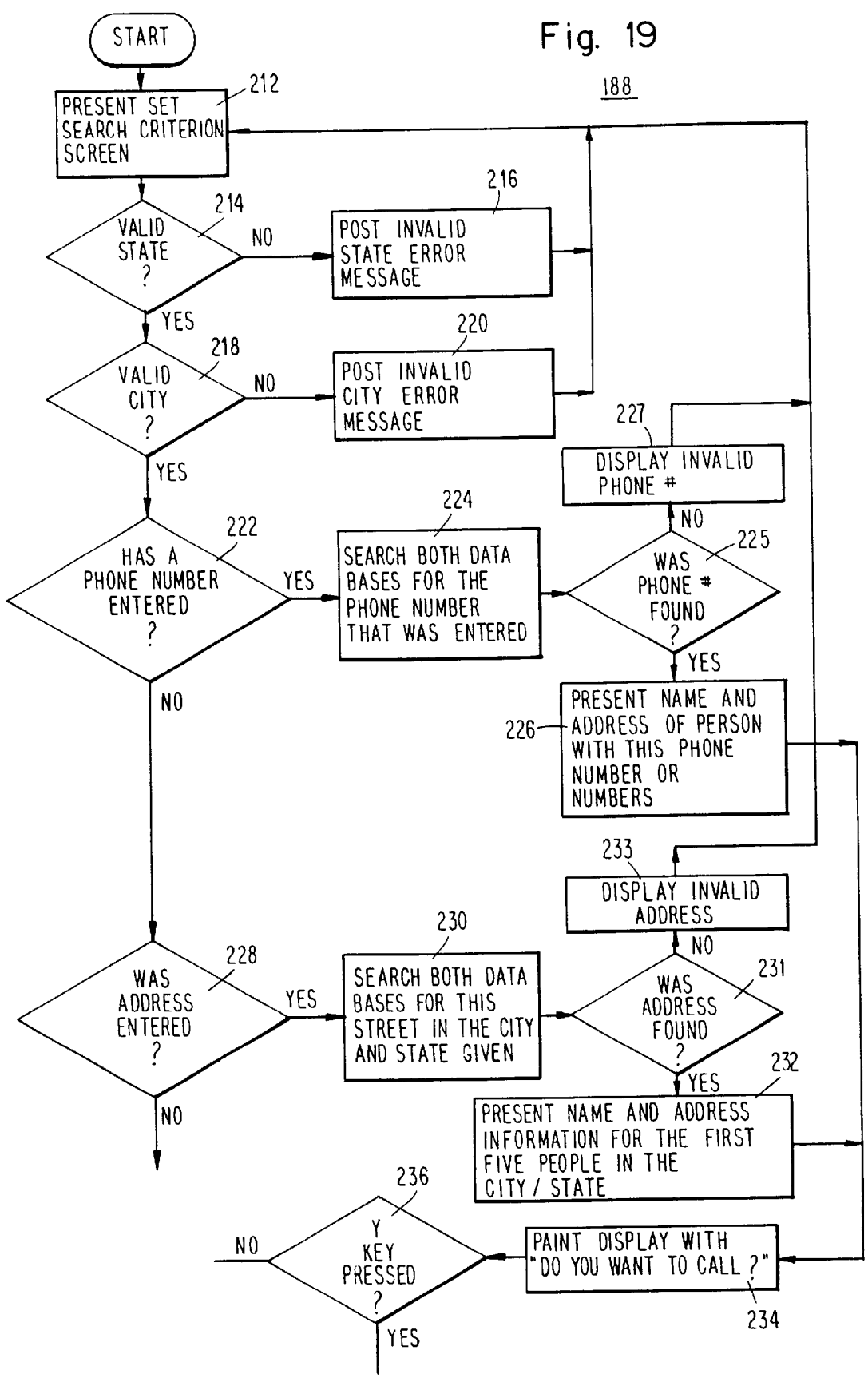
FIG. 19 is a flow diagram of operations performed at the remote subscriber station in response to QWERTY key S and the CTR special key being activated.

In response to operation 178 detecting that the D key of QWERTY keyboard 40 is not activated, subprogram 124 advances to operation 182, during which a determination is made as to whether the S key of the QWERTY keyboard 40 is activated. In response to the S key of QWERTY keyboard 40 being activated, search criterion subprogram 184, illustrated in detail in FIG. 19, is set and executed.

In response to operation 182 detecting that the S key of QWERTY keyboard 40 is not activated, the program advances to operation 186, during which a determination is made as to whether the Z key of QWERTY keyboard 40 is activated. In response to the Z key of the QWERTY keyboard being activated, program 124 advances to operation 188, when new database information is uploaded into memory 36 of remote subscriber station 10 from central station 12; details of these operations are illustrated in FIG. 20.

If operation 186 indicates the Z key of QWERTY keyboard 40 is not activated, the operator apparently improperly activated a key of QWERTY keyboard 40 after activating CTR key 42. It is, therefore, necessary to reset the system to the initial condition indicated by FIG. 3, which is performed automatically during operation 190.

Subprogram 124 of FIG. 17 is exited and the program returns to operation 102, FIG. 15, after execution of an appropriate one of operations 164, 170, 176 or 190 or execution of the appropriate one of subprograms 180, 184 or 188. The main program of FIG. 15 is then re-entered to await the next activation of a key on keyboard 22 or 40.

Default criterion subprogram 180, details of which are illustrated in the flow diagram of FIG. 18, is entered in response to operation 178, FIG. 17, detecting the D key of QWERTY keyboard 40 has been activated immediately after activation of CTR key 42. It will be recalled, from the prior description of FIG. 12, that default criterion subprogram 180 is executed when it is desired to change the geographic region which is normally entered when power is initially applied to microprocessor 32 and its associated circuitry. The first operation 200 executed during subprogram 180 is to retrieve from disc memory 36 the present default region, i.e., the geographic region to which the display normally returns and from which data are read from memories 34 and 36 prior to the change now being made. The box on the right side of the display is provided with the legend "default search criterion." The user then enters the new default region, by city and state.

After the user has activated ENTER key 50, subprogram 180 advances to operation 202, during which signals representing the characters in the state on the second line of display 39, as coupled from the keyboard buffer of microprocessor 32 to random access memory 38, are compared with signals representing the characters for all of the states stored in memories 34 and 36. If the signals for the state entered in the second line of the display are not the same as the signals for one of the states in memories 34 or 36, the comparator in microprocessor 32 activates a memory location of the ROM associated with microprocessor 32 or of disc memory 36 to supply the display buffer of microprocessor 32 with a signal associated with the legend INVALID STATE. The INVALID STATE message is supplied to display 39 during operation 204.

In response to operation 202 indicating a valid state was typed on the second line of the display, the program advances to operation 206, during which memories 34 and 36 are searched to find the regions within the state found to be valid during operation 202. During operation 206, all signals representing cities or regions in the state which was found in at least one of memories 34 and 36 are compared in microprocessor 32 with signals representing the city or region on the first line of display 39. In response to operation 206 detecting that the city or region on the first line of the display is not in the state on the second line of the display, the program advances to operation 208 during which operations similar to operation 204 are performed and display 39 is provided with indicia for the message INVALID CITY.

In response to operation 206 indicating a valid city or region and a valid state were respectively entered on the first and second lines of display 39, the program advances to operation 210 during which the new default city or region and state are written into an address of random access memory 38 or into an address in disc memory 36 which is normally accessed when remote subscriber station 10 is initially energized or after the remote station has been transiently activated to a different state and/or region. After operation 210, subprogram 180 is exited and the program returns to the first operation 102 of the main program, FIG. 15. If either operation 204 or 208 is executed, subprogram 180 thereafter returns to operation 200 and the user is instructed by display 39 to insert a new default state and/or region.

Set search criterion subprogram 184, a flow diagram of which is illustrated in FIG. 19, is entered in response to the user energizing the S key of QWERTY keyboard 40 immediately after having activated CTR key 42.

The search criterion subprogram 184 of FIG. 19 is entered when the user desires to change the basis for accessing subscriber information from the normal mode described in connection with FIGS. 3–6 to one of the other modes described in connection with FIGS. 7–9 and FIGS. 10 and 11. In other words subprogram 184 enables sought subscriber address and phone number information to be obtained from subscriber name or enables sought subscriber name and telephone number to be obtained from an address. Subprogram 184 is also entered if the user desires to transiently change the region and/or state for which directory information is to be sought.

The first operation 212 performed by subprogram 184 is to supply the box on the right side of display 39 with a signal causing the box to contain the legend PRESENT SET SEARCH CRITERION. Then, if appropriate, the user activates the keys of QWERTY keyboard 40 to enter a new city and/or state for which directory information is transiently desired. Signals representing these data are loaded into RAM 38. After QWERTY keyboard 40 has been so activated, the state and city representing signals in RAM 38 are compared with data representing states and cities in memories 34 and 36. If the comparison is negative, an INVALID STATE or INVALID CITY message, as appropriate, is supplied to display 39 during operations 214, 216, 218 and 220, in the same manner described supra in connection with FIG. 18 for operations 202, 204, 206 and 208. After either of operations 216 or 220, associated with posting invalid state and city messages on display 39, is executed, subprogram 184 returns to operation 212 and the user should insert a new state or city.

If, however, a "yes" determination is made during operation 218, indicative of a valid state and city having just been typed by the user or previously entered for normal operation, the program advances to operation 222 during which a determination is made as to whether a phone number was entered on the fourth line of display 39. In response to operation 222 providing a YES response, the portions of the databases for the entered city and state in memories 34 and 36 are searched during operation 224 and compared, as indicated by operation 225, with the telephone number that was entered. When a comparison of operation 225 indicates there is a telephone number in the database of memory 34 or 36 that is the same as the number entered by the user in the fourth line of display 39, name and address data signals at the location in memory 34 or 36 where the phone number is the same as the phone number entered by the user are read to the display buffer memory in microprocessor 32, thence to display 39. If, however, the phone number entered by the user is not the same as any of the phone numbers in memories 34 or 36 for the region (city) and state being searched, an address in the read-only memory associated with microprocessor 32 is accessed during operation 227; at this address of the ROM is stored a signal corresponding with the legend INVALID PHONE NUMBER. The signal corresponding with the INVALID PHONE NUMBER message is read from the read-only memory to the buffer memory in microprocessor 32 for display 39, causing the display to be provided with indicia reading INVALID PHONE NUMBER.

In response to operation 222 determining that a phone number was not entered, the program advances to operation 228, during which a determination is made as to whether an address was entered on the third line of display 39. In response to operation 228 detecting that an address was entered on the third line of display 39, the program advances to operation 230 during which the databases of memories 34 and 36 for the region (city) and state under consideration are searched for all telephone subscribers at the entered address. When the comparison of operation 230 indicates an identity between the address of each subscriber at the entered address in each of memories 34 and 36, the information for each subscriber at the address is read out during operation 230 from memory 34 or 36 into random access memory 38 and a YES output is produced by operation 231 to indicate an address was found. In response to the YES output of operation 231, directory indicating signals at the addresses in RAM 38 where the data for the corresponding street addresses are located are downloaded during operation 232 from the random access memory into the display buffer memory in microprocessor 32, thence to display 39. Additional addresses loaded into RAM 38 as a result of operation 230 are read out from the RAM into the buffer memory for display 39 in microprocessor 32 in response to the user activating DOWN key 48. If, however, there are no subscribers at the entered address, operation 231 produces a NO output and operation 233 is executed. During operation 233 the buffer memory in microprocessor 32 for display 39 is supplied by the ROM associated with the microprocessor with a signal associated with indicia for the message INVALID ADDRESS. Accordingly, display 39 is provided with a legend reading INVALID ADDRESS.

If operation 228 produces a NO output, indicating that the directory database formed by memories 34 and 36 is not to be searched for either phone number or address, the program advances to operation 106, enabling searching to be done by sought subscriber name for the newly entered region (city) and, if applicable, state. The names in memories 34 and 36 for the newly entered geographic region are then searched as described supra in connection with FIGS. 3–6 and 15.

If either of operations 227 or 233 is executed, the program returns to operation 212 to enable the user to type a different city or state on QWERTY keyboard 40. If either of operations 226 or 232 is executed, the program advances to step 234 during which an address in the ROM associated with microprocessor 32 storing a signal for the legend DO YOU WANT TO CALL? is read and the signal at the address is transferred to the display buffer of microprocessor 32, causing display 39 to post this legend. If the user then presses the Y key of QWERTY keyboard 40, as detected during operation 236, the program then advances to operation 148 and the number of the sought subscriber is called, as described supra. If the user responds to the message printed on display 39 during operation 234 by activating a key on either of keyboards 22 or 40 other than the Y of QWERTY keyboard 40, the program returns to operation 102, FIG. 15.

Reference is now made to FIG. 20 of the drawing, a flow diagram of upload new database information subroutine 188, FIG. 17, which is executed in response to the Z key of the QWERTY keyboard being activated immediately after activation of CTR key 42. When subroutine 188 is first entered, an address in the ROM associated with microprocessor 32 is read to cause the buffer for display 39 in microprocessor 32 to be loaded with signals indicative of the message DO YOU WANT TO CONTINUE? If the user activates any key on QWERTY keyboard 40 other than the Y key, subroutine 188 advances from operation 240 to operation 242, causing the program to return to the beginning of the main program, operation 102, FIG. 15.

If the user presses the Y key of QWERTY keyboard 40 in response to the indicia displayed during operation 240, subroutine 188 advances to operation 244 during which a signal indicative of the telephone number for central station 12 is read from the ROM associated with microprocessor 32. The telephone number signal is routed through microprocessor 32 to modem 56, which sends dialing signals for central station 12 to the central station via telephone line 14.

In response to central station 12 responding to the dialing signal from remote subscriber station 10, operation 246 is performed. During operation 246 remote subscriber station 10 sends to central station 12 a log in signal indicative of the identification of the remote subscriber station. The log in signal is stored in an address of the ROM associated with microprocessor 32 and coupled from this address via the microprocessor to modem 56, thence to station 12. Central station 12 responds to the log in signal sent during operation 246 to transmit back to remote subscriber station 10 a signal indicating a correct log in has been accomplished between the remote subscriber station and central station 12. Such a signal is stored in an address of random access memory 38 of remote subscriber station 10.

A predetermined time interval after dialing operation 244 has been completed, a determination is made during operation 248 as to whether an appropriate address of RAM 38 is loaded with a signal from central station 12 indicative of completion of a connection and a log in operation between remote subscriber station 10 and the central station. If, after the predetermined time interval has elapsed the log in signal has not been loaded into RAM 38, a counter in microprocessor 32 is incremented during operation 249 and a determination is then made during operation 250 as to whether four dial and log in attempts have been completed. If fewer than four dial and log in attempts are detected during operation 250, by detecting the count in the counter incremented during operation 249, the program advances from operation 250 to operation 244 and operations 246 and 248 are repeated. If four dial and log in attempts have been attempted without a successful log in being detected during operation 248, operation 252 is executed. During operation 252, the buffer in microprocessor 32 for display 39 is loaded by the ROM associated with the microprocessor with signals indicative of the message UNABLE TO LOG IN. This message is then displayed on display 39, after which the program returns to operation 102 of the main logic program of FIG. 15.

In response to operation 248 indicating a correct log in had been achieved, central station 12 is activated to download all new subscribers in all geographic areas covered by memory 34 since the most recent previous access by the particular remote subscriber station 10 of central station 12; operation 256. To this end, central station 12 stores in disc memory 72 thereof an indication of the last date when every remote subscriber station 10 accessed central station 12. Microprocessor 70 responds to a clock therein indicative of the date of the current access and the date stored in memory 72 indicative of the most recent previous access by the particular remote subscriber station 10 of the central station to assemble all the new subscribers to the telephone directory from the most recent previous date to the current date. Data signals for the updated directory are then transmitted from disc memory 72 via microprocessor 70 and modem 78 to remote subscriber station 10 via line 14. These data signals are routed at remote subscriber station 10 through modem 56 and microprocessor 32 to disc memory 36, where they are stored for future use as described supra. The data signals transmitted from station 12 to station 10 include the usual directory information, i.e., subscriber name, address and telephone number, as well as the address in memory 36 where they are to be loaded. By including the address in memory 36 where the directory signals are to be loaded, microprocessor 32 does not have to assign addresses to the data signals and merely routes them to the designated memory address.

After operation 256 has been completed, the program advances to operation 258, during which an address in the ROM associated with microprocessor 32 containing signals for the message on display 39 which reads DOWN LOAD COMPLETED AND OK is accessed. A signal containing this message is then coupled from the ROM through microprocessor 32 to display 39 via the buffer in the microprocessor for the display. Upon completion of operation 258, the program returns to operation 102 of the main program of FIG. 15. The system of remote subscriber station 10 is then ready to resume normal operation.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. An apparatus dedicated to obtain telephone directory information and to place and receive telephone calls comprising a housing dedicated to a telephone subscriber, the housing including: (i) a microprocessor, (ii) a telephone having a telephone keyboard and a connection to a telephone line for telephone messages, (iii) a permanent, preloaded memory storing data signals representing a telephone directory including names and telephone numbers of substantially all listed subscribers in a geographic area, (iv) a display, (v) a QWERTY keyboard and special keys, the microprocessor being connected to be responsive to signals from said keyboards and special keys and coupled with said memory and display so the memory is provided with signals causing the display to be provided with indicia representing names and telephone numbers of subscribers in the memory, the memory being provided with the signals causing the display to be provided with indicia representing names and telephone numbers of subscribers in the memory only in response to signals derived inside of the housing in response to the signals from said keyboards and special keys, the housing further including a modem connected to the microprocessor for supplying a telephone dialing signal to the telephone line in response to a signal from the microprocessor, the signal from the microprocessor to the modem being derived in response to activation of keys of the keyboards and a signal from said memory, the telephone dialing signal being for a telephone number of a subscriber on said display.

2. An apparatus for use with a telephone comprising a housing dedicated to a telephone subscriber, the housing including: (i) a microprocessor, (ii) a large permanent memory storing signals representing telephone directory data including names and telephone numbers of long term subscribers, (iii) a smaller non-permanent data memory storing names and telephone number s of recent subscribers, (iv) a display, (v) a keyboard including a QWERTY section and special function keys, the microprocessor being connected to (a) said memories, (b) keyboard and (c) display and programmed so said display is provided with signals representing indicia for names and telephone numbers of subscribers from both of said memories in response to activation of keys on said keyboard.

3. The apparatus of claim 2 wherein said housing includes a telephone handset receptacle and a telephone handset keyboard for controlling calls via a handset in the receptacle.

4. The apparatus of claim 2 wherein the housing further includes a modem connected to the microprocessor for supplying a telephone dialing signal to a telephone line in response to a signal from the microprocessor, the signal from the microprocessor to the modem being derived in response to activation of keys of the keyboard and telephone number signals from both of said memories, the telephone dialing signal being for a telephone number of a subscriber on said display.

5. The apparatus of claim 2 further including a modem connected to the microprocessor for supplying the smaller non-permanent memory via the microprocessor with signals representing updated names and telephone numbers of recent subscribers.

6. The apparatus of claim 5 further including a central station connected to a telephone line, wherein the modem responds to signals from the keyboard via the microprocessor for supplying the central station via the telephone line with a command signal for supplying the modems the central station including means responsive to the command signal for supplying the modem via the telephone line with the signals representing updated names and telephone numbers of recent subscribers.

7. The apparatus of claim 6 wherein the command signal is accompanied by signals indicative of a telephone number for the modem and a date when the most recent prior update occurred, the central station responding to the signals accompanying the command signal to redial the modem telephone and supply signals representing updated names and telephone numbers the updated names and telephone numbers being for the interval from the most recent prior date when the names and telephone numbers were updated to the redialing.

8. The apparatus of claim 5 wherein the modem is connected to the microprocessor and supplies a telephone dialing signal to a telephone line in response to a signal from the microprocessor, the signal from the microprocessor to the modem being derived in response to activation of keys of the keyboard and a signal from one of said memories, the telephone dialing signal being for a telephone number of a subscriber on said display.

9. An apparatus dedicated to obtain telephone directory information and to place and receive telephone calls comprising a housing dedicated to a telephone subscriber, the housing including: (i) a microprocessor, (ii) a telephone having a telephone keyboard and a connection to a telephone line for telephone messages, (iii) a permanent, preloaded memory storing data signals representing a telephone directory including names and telephone numbers of substantially all listed subscribers in a geographic area, (iv) a display, (v) a QWERTY keyboard and special keys, the microprocessor being connected to be responsive to signals from said keyboards and special keys and coupled with said memory and display so the memory is provided with signals causing the display to be provided with indicia representing names and telephone numbers of subscribers in the memory, the memory being provided with the signals causing the display to be provided with indicia representing names and telephone numbers of subscribers in the memory only in response to signals derived inside of the housing in response to the signals from said keyboards and special keys, the microprocessor being connected to (a) said memory means, (b) keyboard and (c) display and programmed so said display is provided with signals causing simultaneous display of names and telephone numbers of plural subscribers from said memory means in response to activation of QWERTY keys on said keyboard and the special function keys.

10. The apparatus of claim 9 wherein the microprocessor is connected to said memory means, keyboard and display and programmed so said display is provided with signals also causing display of (a) a name and address of a subscriber from said memory means in response to activation of keys on said keyboard indicative of a telephone number and the special function keys and (b) a name and telephone number of a subscriber from said memory means in response to activation of QWERTY keys on said keyboard and the special keys.

11. An apparatus dedicated to obtain telephone directory information and to place and receive telephone calls comprising a housing dedicated to a telephone subscriber, the housing including: (i) a microprocessor, (ii) a telephone having a telephone keyboard and a connection to a telephone line for telephone messages, (iii) a permanent, preloaded memory storing data signals representing a telephone directory including names and telephone numbers of substantially all listed subscribers in a geographic area, (iv) a display, (v) a QWERTY keyboard and special keys, the microprocessor being connected to be responsive to signals from said keyboards and special keys and coupled with said memory and display so the memory is provided with signals causing the display to be provided with indicia representing names and telephone numbers of subscribers in the memory, the memory being provided with the signals causing the display to be provided with indicia representing names and telephone numbers of subscribers in the memory only in response to signals derived inside of the housing in response to the signals from said keyboards and special keys, the microprocessor being connected to (a) said memory means, (b) keyboard and (c) display and programmed so said display is provided with signals causing display thereon of a name and telephone number of a subscriber from said memory means in response to activation of QWERTY keys on said keyboard and the special keys, the display being supplied with signals causing simultaneous display thereon of the names and telephone numbers of different plural subscribers from said memory means in response to the QWERTY keys being activated for a single address.

12. The apparatus of claim 11 wherein the display is supplied with signals causing display of the names and telephone numbers of different plural subscribers from said memory means in response to the QWERTY keys being activated for a single address.

13. An apparatus dedicated to obtain telephone directory information and to place and receive telephone calls comprising a housing dedicated to a telephone subscriber, the housing including: (i) a microprocessor, (ii) a telephone having a telephone keyboard and a connection to a telephone line for telephone messages, (iii) a permanent, preloaded memory storing data signals representing a telephone directory including names and telephone numbers of substantially all listed subscribers in a geographic area, (iv) a display, (v) a QWERTY keyboard and special keys, the microprocessor being connected to be responsive to signals from said keyboards and special keys and coupled with said memory and display so the memory is provided with signals causing the display to be provided with indicia representing names and telephone numbers of subscribers in the memory, the memory being provided with the signals causing the display to be provided with indicia representing names and telephone numbers of subscribers in the memory only in response to signals derived inside of the housing in response to the signals from said keyboards and special keys, and further including a modem connected to the microprocessor for supplying the smaller non-permanent memory via the microprocessor with signals representing updated names and telephone numbers of recent subscribers.

14. The apparatus of claim 13 further including a central station connected to a telephone line, wherein the modem responds to signals from the keyboard via the microprocessor for supplying the central station via the telephone line with a command signal for supplying the modem, the central station including means responsive to the command signal for supplying the modem via the telephone line with the signals representing updated names and telephone numbers of recent subscribers.

15. The apparatus of claim 14 wherein the command signal is accompanied by signals indicative of a telephone number for the modem and a date when the most recent prior update occurred, the central station responding to the signals accompanying the command signal to redial the modem telephone and supply signals representing updated names and telephone numbers, the updated names and telephone numbers being for the interval from the most recent prior date when the names and telephone numbers were updated to the redialing.

16. An apparatus dedicated to obtain telephone directory information and to place and receive telephone calls comprising a housing dedicated to a telephone subscriber, the housing including: (i) a microprocessor, (ii) a telephone having a telephone keyboard and a connection to a telephone line for telephone messages, (iii) a permanent, preloaded memory storing data signals representing a telephone directory including names and telephone numbers of substantially all listed subscribers in a geographic area, (iv) a display, (v) a QWERTY keyboard and special keys, the microprocessor being connected to be responsive to signals from said keyboards and special keys and coupled with said memory and display so the memory is provided with signals causing the display to be provided with indicia representing names and telephone numbers of subscribers in the memory, the memory being provided with the signals causing the display to be provided with indicia representing names and telephone numbers of subscribers in the memory only in response to signals derived inside of the housing in response to the signals from said keyboards and special keys, the display including plural display lines for plural subscribers, the special keys include keys for controlling the microprocessor and memory to cause (a) scrolling of subscribers on the display and (b) selecting one of the displayed subscribers; the microprocessor and memory responding to a signal indicative of the selected displayed subscriber, as derived from one of the special keys, for supplying a dialing signal indicative of the phone number of the selected subscriber to the telephone line.

17. The apparatus of claim 16 wherein the special keys include keys for controlling the microprocessor and memory to cause scrolling of subscribers on the display so there are jumps in the displayed subscribers substantially equal to the number of lines in the display.

* * * * *